(12) United States Patent
Heller et al.

(10) Patent No.: US 6,799,740 B2
(45) Date of Patent: Oct. 5, 2004

(54) CHEMICAL APPLICATION AND FLIGHT GUIDANCE CONTROL SYSTEM AND METHOD

(75) Inventors: Larry D. Heller, Osteen, FL (US); William H. Reynolds, Debary, FL (US); E. Doug Jones, Deleon Springs, FL (US)

(73) Assignee: Adapco, Inc., Sanford, FL (US)

( * ) Notice: Subject to any disclaimer, the term of this patent is extended or adjusted under 35 U.S.C. 154(b) by 0 days.

(21) Appl. No.: 10/397,040

(22) Filed: Mar. 25, 2003

(65) Prior Publication Data

US 2003/0225488 A1 Dec. 4, 2003

Related U.S. Application Data

(60) Provisional application No. 60/367,440, filed on Mar. 25, 2002.

(51) Int. Cl.[7] .................................................. B64D 1/16
(52) U.S. Cl. ...................................... 244/136; 239/171
(58) Field of Search ............................ 244/136, 30, 31; 239/171

(56) References Cited

U.S. PATENT DOCUMENTS

| | | | |
|---|---|---|---|
| 2,941,753 A | * | 6/1960 | Ripper ........................ 244/190 |
| 3,781,893 A | * | 12/1973 | Beukers et al. ............. 343/702 |
| 4,842,221 A | | 6/1989 | Beach et al. |
| 4,995,572 A | | 2/1991 | Piasecki |
| 5,265,024 A | * | 11/1993 | Crabill et al. ................ 701/200 |
| 5,334,987 A | * | 8/1994 | Teach .......................... 701/214 |
| 5,390,040 A | | 2/1995 | Mayeux |
| 5,470,032 A | * | 11/1995 | Williams et al. ........... 244/1 TD |
| 5,909,299 A | | 6/1999 | Sheldon, Jr. et al. |
| 6,010,093 A | | 1/2000 | Paulson |
| 6,087,984 A | | 7/2000 | Keller et al. |
| 6,243,649 B1 | | 6/2001 | Wetherbee et al. |
| 6,266,595 B1 | | 7/2001 | Greatline et al. |
| 6,353,409 B1 | | 3/2002 | Keller et al. |
| 6,424,295 B1 | | 7/2002 | Lange |
| 6,510,805 B2 | * | 1/2003 | Fima et al. .................. 111/100 |
| 2002/0030117 A1 | | 3/2002 | Bryan et al. |
| 2002/0167702 A1 | | 11/2002 | Badesha et al. |

FOREIGN PATENT DOCUMENTS

WO       WO 93015955       *   8/1993       ................. 244/136

* cited by examiner

Primary Examiner—Tien Dinh
(74) Attorney, Agent, or Firm—Allen, Dyer, Doppelt, Milbrath & Gilchrist, P.A.

(57) ABSTRACT

A chemical distribution such as a mosquito control guidance system is operable for controlling the distribution of airborne product via an aircraft passing over a target field. The system includes a weather station carried by a helium balloon positioned at aircraft altitude which communicates with a ground weather station positioned at or near the target field for transmitting weather data in real time to a central communications station and the aircraft for providing guidance in accurately, safely and effectively distributing chemicals onto the target field.

14 Claims, 6 Drawing Sheets

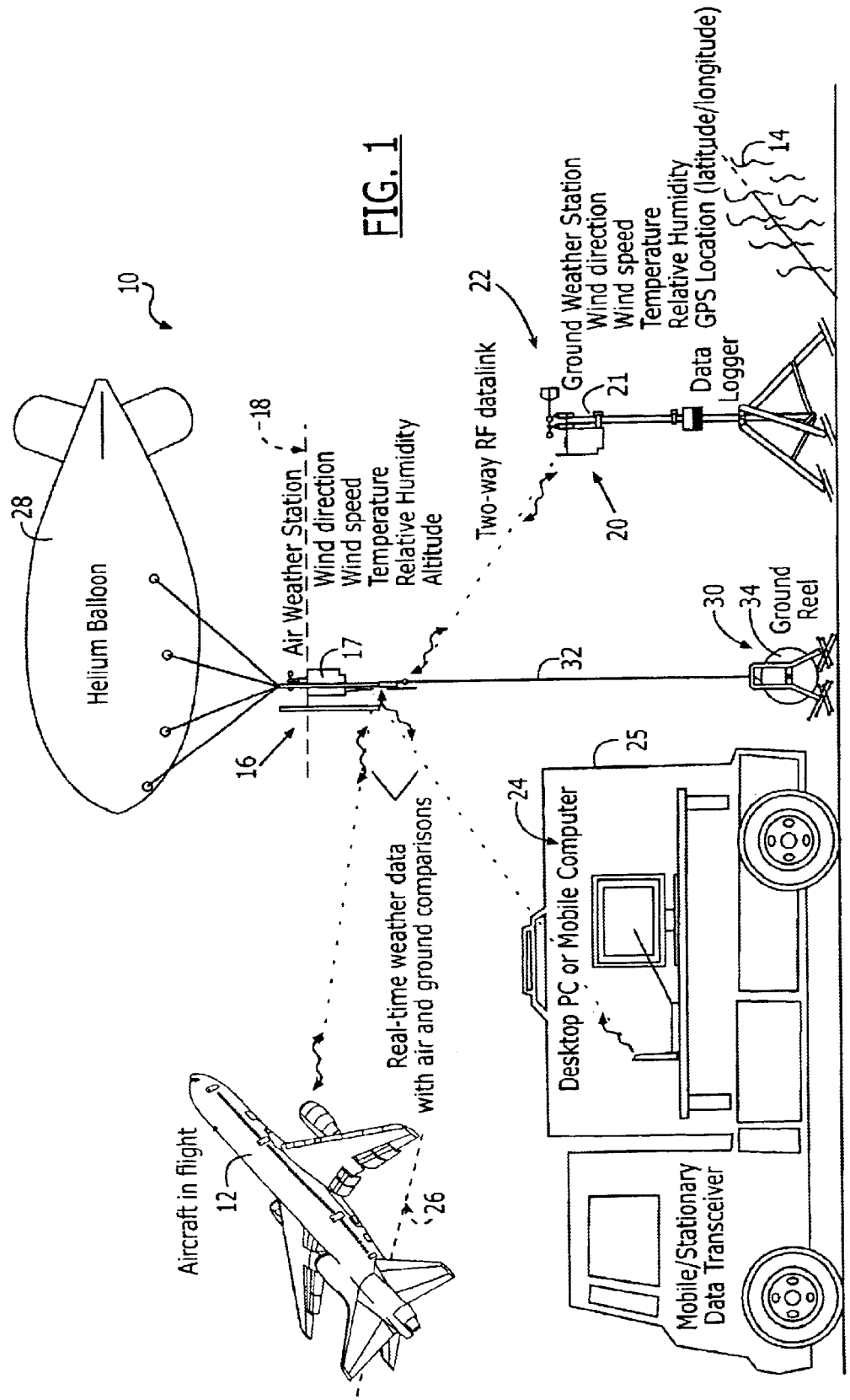

FIG. 5

CHEMICAL APPLICATION AND FLIGHT GUIDANCE CONTROL SYSTEM AND METHOD

CROSS-REFERENCE TO RELATED APPLICATIONS

This application claims priority to Provisional Application No. 60/367,440 filed on Mar. 25, 2002 for "Mosquito Control Guidance System and Method" the disclosure of which is herein incorporated by reference in its entirety, all commonly owned with the present invention.

FIELD OF THE INVENTION

This invention generally relates to aerial spraying of chemicals including insecticides, fertilizers and the like, and more particularly to guidance of such aerial spraying for more accurate, safe, and cost effective applications

BACKGROUND OF THE INVENTION

The need for safe application of pesticides is well known by these skilled in the art aware of the specific dangers and requirements for meeting established government standards, as well as the educated public aware of health hazards associated with chemicals use to control pests in our environment. By way of example, government statutes are created to regulate the distribution, sale, and use of pesticides to protect people and the environment from adverse effects. Research and technology continually effects and enhances methods and procedures including the control of pest and vector mosquitoes. The use of global positioning satellites improved aerial application of pesticides with research on droplet spectrums and the ability to predict the ultimate fate of these droplets released has emphasized the need and importance of meteorology and real-time application optimization.

Ground weather and tracking of vehicles is well known as illustrated by way of example with the disclosure of U.S. Pat. No. 6,424,295 for a GPS weather data recording system for use with the applications of chemicals to agricultural fields. Here, a GPS weather data recording system is used to determine a series of positions of a ground vehicle and the velocity of the vehicle as it traverses an agricultural field. The series of positions and velocity trace the ground track across the field while a wind sensor is used to measure wind velocity with respect to the vehicle. As described, during crop dusting, the dispensing vehicle usually a tractor, makes numerous sequential, adjacent passes, dispensing chemicals in a swath across the field in each pass. The tractors driver carefully follows a ground track which ensures that each successive swath over the field is correctly spaced, distance wise, from the previous swath in order to avoid gaps or overlaps in coverage. Should one swath occur too close to a previous swath, the overlap area receives excessive amounts of chemicals that may prove very expensive to the farmer and can damage or render crops unusable. As indicated, wind conditions at the commencement of the dispensing operations can be very different from wind conditions half way through or near the end of dispensing operations and as a result it is important that such conditions be properly monitored for accurately tracking these conditions with respect to the ground vehicle position. It can be appreciated that such problems existing for the ground vehicle are very much magnified when attempting to dispense such chemicals from an aircraft. As illustrated by way further example and with reference to U.S. Pat. No. 5,334,987 for an agricultural aircraft control system using a global positioning system, chemicals are applied to an agricultural field in a variety of flight patterns. An aircraft computer stores surface coordinates of the field to be sprayed. Based on stored information, the computer produces a flight pattern having the desired orientation and generates signals representative of the amount and direction of deviation from a desired flight pattern. Such prescription styled farming control systems are used with various navigational controllers as illustrated with reference to U.S. Pat. No. 6,266,595 for a method and apparatus for prescription application of products to an agricultural field.

In spite of known uses of GPS vehicle location systems, chemical prescription application methods, and monitoring of local weather conditions, there remains a need to safely apply such chemicals in an efficient and cost effective manner. The present invention satisfies this need.

SUMMARY OF THE INVENTION

In view of the foregoing background, an invention including a system and method for controlling a prescribed application of chemicals from an aircraft is herein described. One embodiment of the system may include a first weather station positioned at a preselected altitude and a second weather station positioned generally at ground level. A central communications station communicates altitude and ground weather data with the first and second weather stations and provides weather information to an aircraft for an appropriate distribution of chemicals based on real-time weather conditions at ground level and at the aircraft altitude. An aerostat is operable with the first weather station for poisoning it at the preselected altitude. In one embodiment, a winch may be mounted at ground level and operable with a tether attached to the aerostat, preferably a gas filled balloon, for controlling the altitude of the balloon.

The first and second weather stations comprise instruments that may include a magnetometer configured as a directional compass, an anemometer for determining wind speed, a solid state temperature sensor, a solid state sensor for measuring relative humidity, a solid state aneroid pressure transducer for altitude encoding, an RF transmitter employing spread spectrum processing, a two-way RF transceiver, global positioning receiver, and an interfacing microprocessor. The weather data transmitted to the central station for processing may include temperature, relative humidity, altitude, wind speed and direction, data collection time, and data collection date.

A method aspect of the invention may include carrying a first weather station by an aerostat for providing altitude area weather data and tethering the aerostat to a selected aerostat altitude environmentally coupled to a ground target upon which chemicals are to be applied. A second weather station may then be positioned at a ground location environmentally coupled the ground target for providing ground area weather data. An aircraft having chemicals to be distributed may be provided with a flight plan to meet a prescription distribution of the chemicals and the plan may then be based on ground level and aircraft level weather communicated to the aircraft.

In yet another method aspect of the invention, the aerostat may be tethered from an initial altitude to a preselected altitude through intermediate altitudes in between. Altitude and ground area weather data nay then be analyzes at the various altitudes through which the aerostat is moved, and the aircraft altitude may then be changed to a preferred altitude for the chemical distributing based on the altitude and ground area analyzing. Yet further methods include the aircraft communicating with both the first weather station and the second weather station.

Another method aspect of the invention may include carrying a first weather station by an aerostat for providing altitude area weather data, positioning a second weather station at a ground location environmentally coupled the ground target for providing ground area weather data, receiving altitude and ground weather data transmitted from the first and second weather stations at a central communications station, and tethering the aerostat to a first aerostat altitude environmentally coupled to a ground target upon which chemicals are to be applied. Altitude area and ground area weather data may then be transmitted to the central communications station. The aerostat is then tethered at a second aerostat altitude environmentally coupled to a ground target upon which chemicals are to be applied. The tethering and communicating may then be repeated for communicating altitude area and ground area weather data to the aircraft. The aircraft altitude may then be adjusted to the aerostat altitude if appropriate for controlling the distribution of chemicals to the ground target.

The weather data from the altitude and ground positioned weather stations may be synchronized and include temperature, relative humidity, altitude, wind sped and direction, data collection time, and data collection date, and the data may be transmitted at least once every second.

BRIEF DESCRIPTION OF THE DRAWINGS

A preferred embodiment of the present invention as well as others that will become more apparent by referring to the following detailed description and drawings in which:

FIG. 1 is a diagrammatical illustration of one system embodiment of the present invention including a tethered weather station and ground weather station operable with a mobile control station and aircraft for controlling distribution of chemicals onto a ground target;

FIG. 5 is a diagram illustrating changes to the prescribed flight plan of FIG. 4A as modified by changing weather conditions communicated to the aircraft resulting from weather data collected from altitude and ground weather stations of FIG. 1.

DETAILED DESCRIPTION OF THE PREFERRED EMBODIMENTS

Figure 2A:
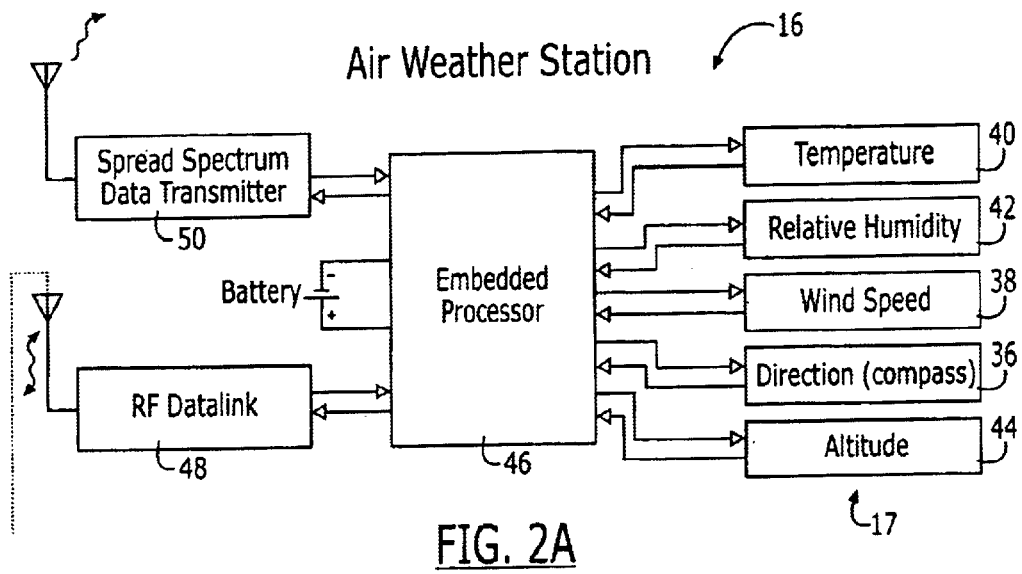
FIGS. 2A and 2B are block diagrams illustrating components of the air weather station and ground weather station, respectively, operable in the system embodiment of FIG. 1.

The present invention will now be described more fully with reference to the accompanying drawings in which preferred embodiments of the invention are shown and described. It is to be understood that the invention may be embodied in many different forms and should not be construed as limited to the illustrated embodiments set forth herein. Rather, the applicant provides these embodiments so that this disclosure will be thorough and complete, and will convey the scope of the invention to those skilled in the art. Like numbers refer to like elements there through.

As illustrated initially with reference to FIG. 1, one preferred embodiment of the present invention includes a system 10 for controlling a prescribed application of chemicals from an aircraft 12 onto a ground target 14. A first weather station 16 is positioned at a preselected altitude 18 and a second weather station 20 is positioned generally at ground level, preferably at or near the ground target 14. A central communications station 24, which may be carried within a mobile ground unit 25 or by way of example optionally in the aircraft 12, communicates altitude and ground weather data with the first and second weather stations 16, 20 and provides weather information to the aircraft 12 for effecting an appropriate distribution of chemicals from the aircraft onto the ground target 14 based on real-time weather conditions at ground level 22 and at an aircraft altitude 26.

With continued reference to FIG. 1, an aerostat, herein described in one preferred embodiment comprising a helium gas balloon 28, is carries the first weather station 16 for positioning it at the preselected altitude 18. A winch 30 is positioned at ground level 22 and is operable with a tether 32 carried on a reel 34 of the winch at one end and attached to the balloon 28 at the other for controlling the altitude of the balloon. Optionally, the first weather station may be carried by a tower of other similar structure for positioning it at the preselected altitude.

Figure 2B:
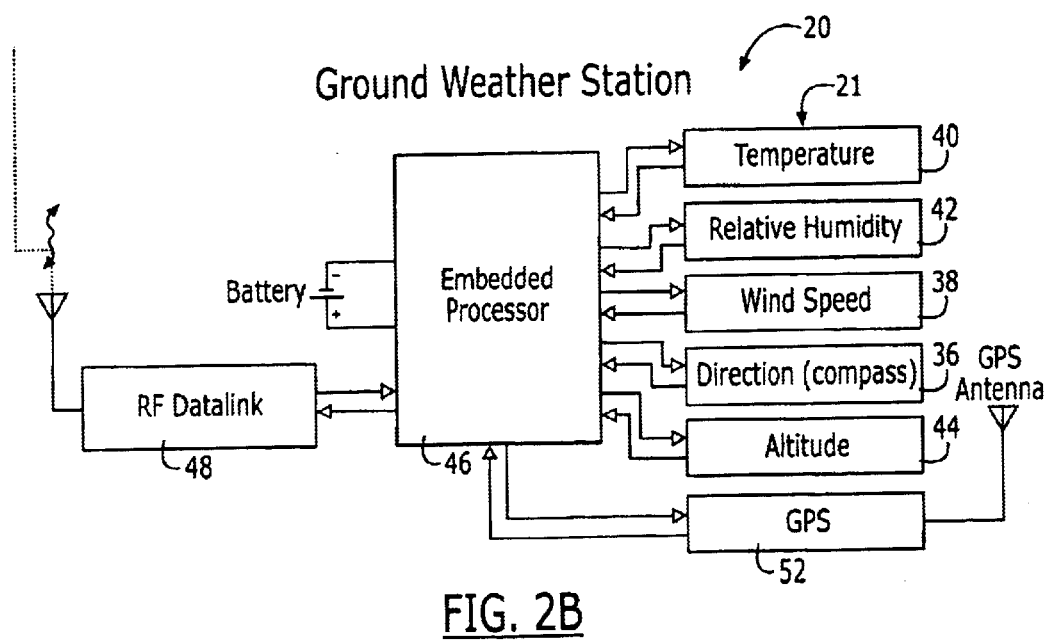

With reference now to FIGS. 2A and 2B, each of the first and second weather stations 16, 20 comprise sensors 17, 21 that may include a magnetometer configured as a directional compass 36, an anemometer 38 for determining wind speed, a solid state or other appropriate temperature sensor 40, a solid state or other appropriate humidity sensor 42 for measuring relative humidity, and a solid state aneroid or other pressure sensor/transducer 44 for altitude encoding, all of which provide weather related data to a processor 46 that processes input data and transmits the data through a two way RF transceiver/RF data link 48. The processor 46 is also operable for communicating with the sensors 17, 21. For improved signaling and data transmission to the aircraft 12, the first weather station 16 preferably includes an RF transmitter 50 employing spread spectrum processing. A global positioning receiver 52 is carried by the second weather station 20, preferably positioned at ground level 22 proximate the ground target 14 for providing a reference position useful in programming a flight plan for the aircraft 12. The weather data transmitted to the central station 24 for further may generally include temperature, relative humidity, altitude, wind speed and direction, data collection time, and data collection date.

Figure 3:
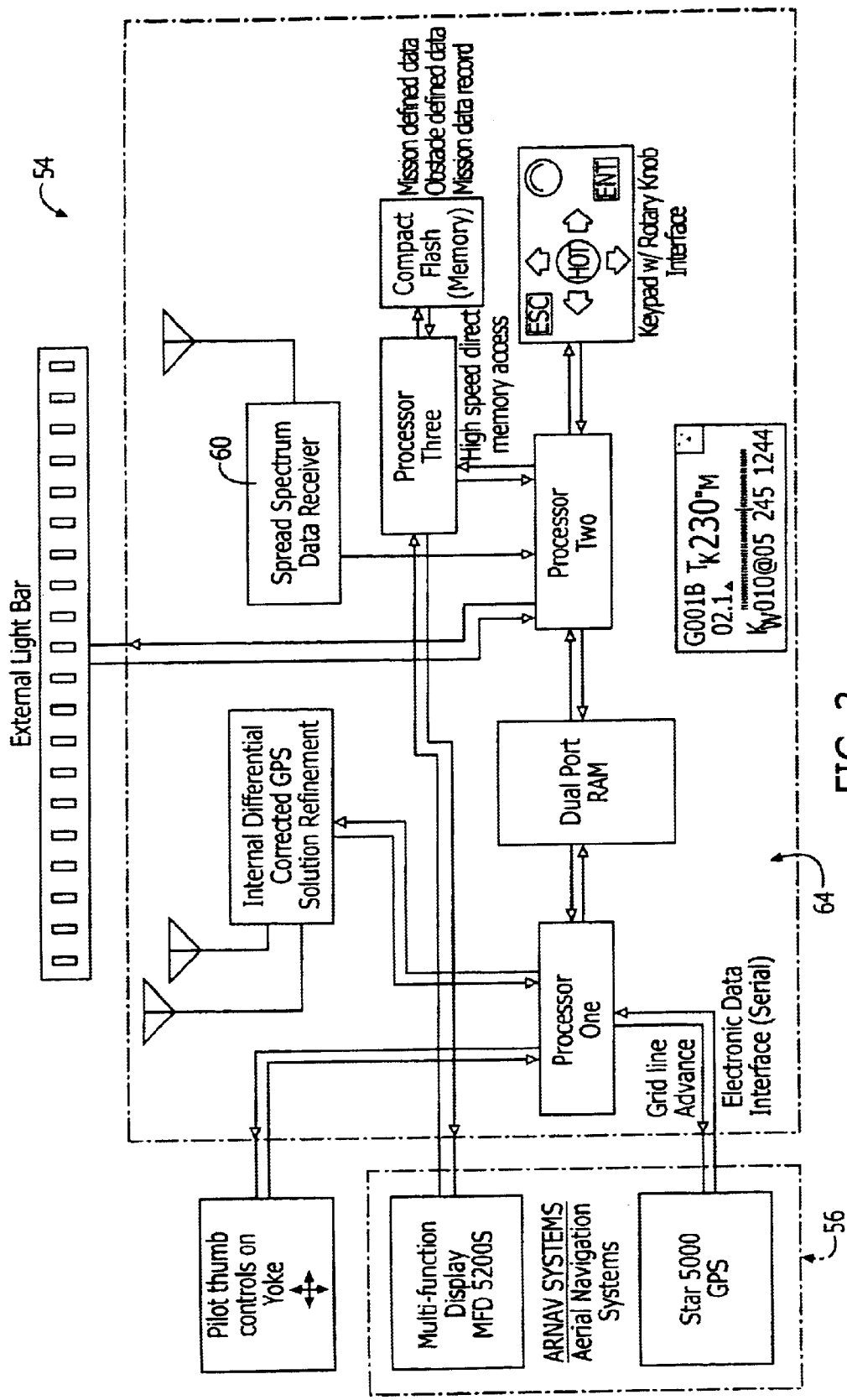
FIG. 3 is a block diagram illustrating one embodiment of a system guidance portion of the present invention carried by the aircraft.
Figure 4A:
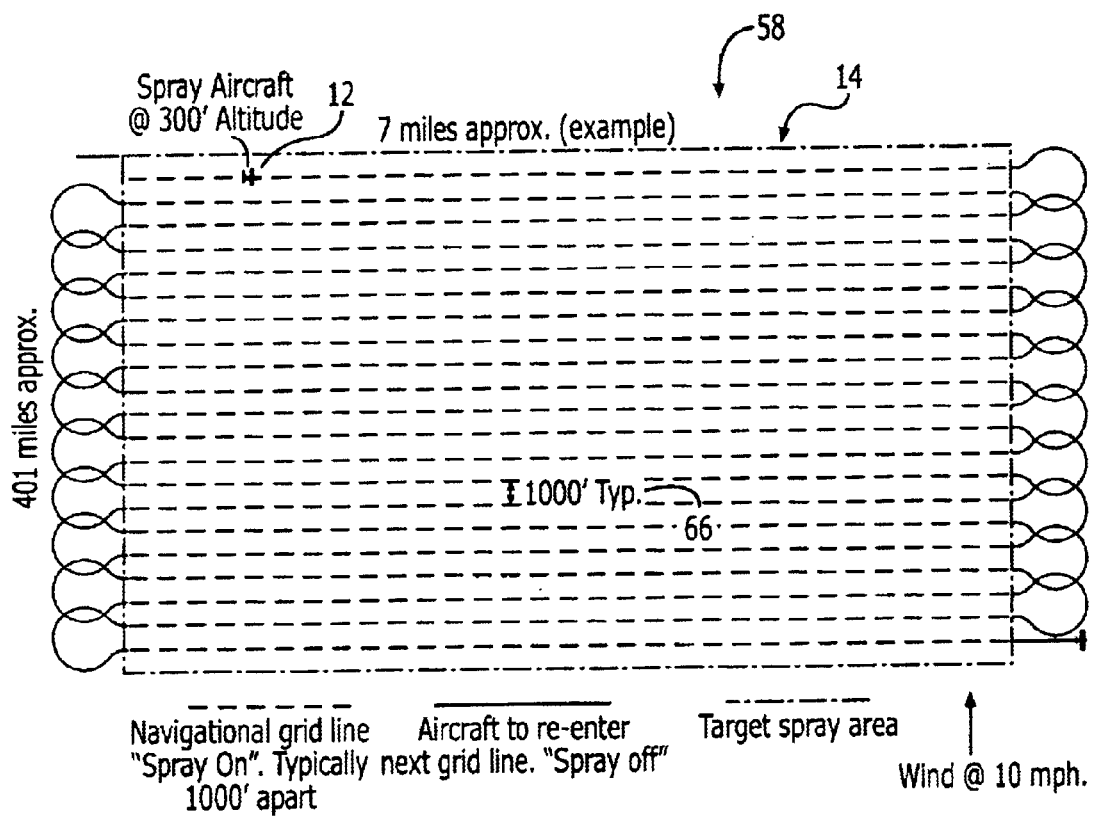
FIG. 4A is a diagram illustrating a prescribed flight plan over a target field during one weather condition.
Figure 4B:
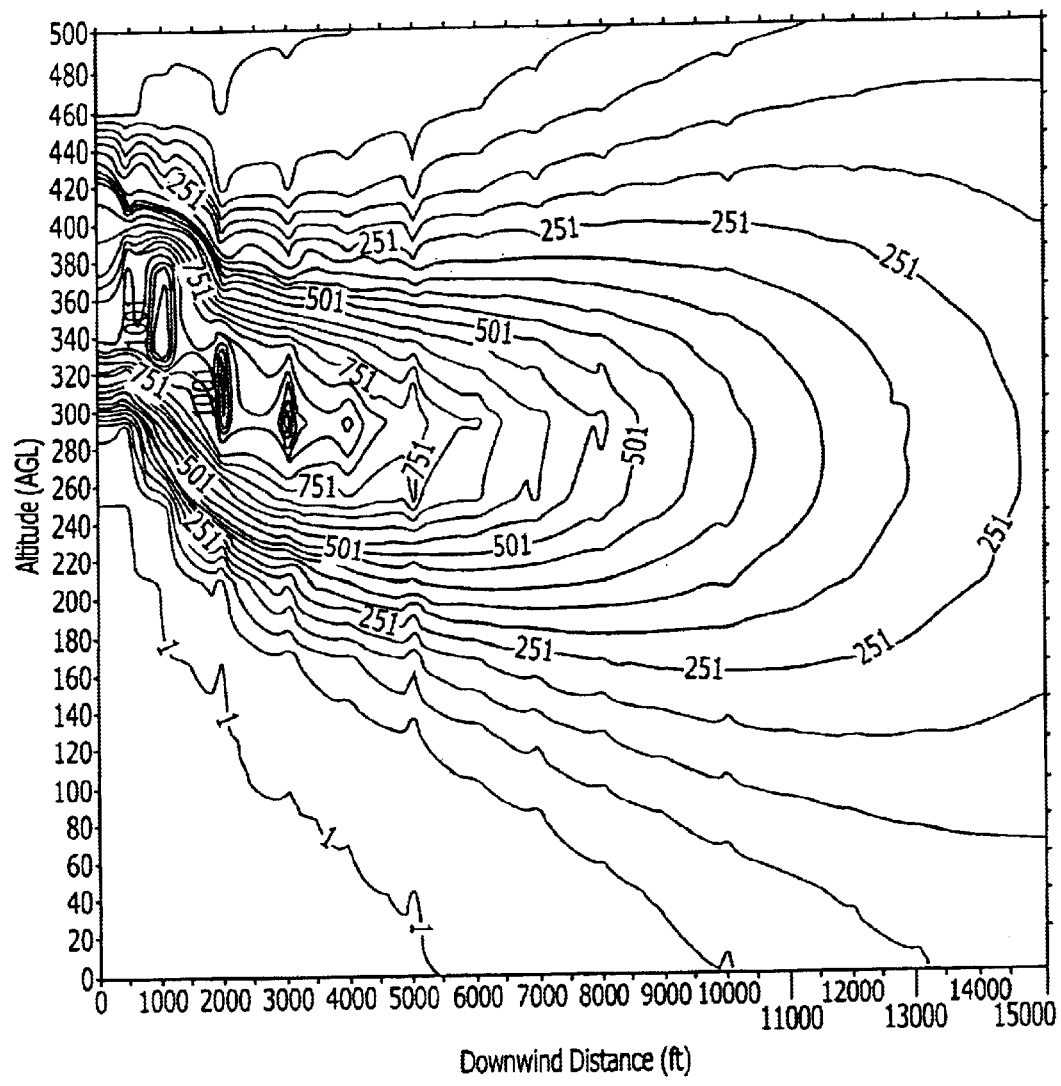
FIG. 4B is a plot illustrating droplet density at various altitudes for distances downwind a chemical release from the aircraft during a sample wind condition.

The aircraft 12 preferably includes a guidance system 54, as illustrated with reference to FIG. 3, which may communicate with the weather stations 16, 20 and the central communications station 24. As illustrated by way of example, the guidance system 54 may operate with an onboard navigation system 56 for positioning the aircraft 12 proximate the ground target 14 and for following a prescribed flight pattern 57, as illustrated by way of example with reference to FIG. 4A, over the ground target 14 during the distribution of chemicals. As earlier described with reference to FIG. 2A, the aircraft 12 receives data directly from the spread spectrum data transmitter 50 of the first weather station 16 by the receiver 60 of the guidance system 54. As illustrated with reference to FIG. 4B and by way of example, weather conditions can dramatically affect the distribution of chemicals dropped from the aircraft 12. The guidance system 54 operates to provide the prescribed flight pattern 58 and an appropriate modified pattern 62, resulting from processing of weather data earlier described, as illustrated with reference by way of example, to FIG. 5, using processed weather data from the off aircraft stations 16, 20 and flight pattern software provided information from the processors 64 of the onboard guidance system 54. With reference again to FIG. 3, the guidance system 54 provides precision guidance to a pilot of the aircraft 12 including obstacle awareness, flight recording and displays, meteorological data on a real-time basis and for a target area of interest. By way of example, the onboard guidance system 54 may provide tactical, strategic, and real-time support as follows:

Tactical: (Mission Critical Tasks and Safety)
1. Precision flight guidance
2. Obstacle awareness
3. Heads-up display
4. In Pilot's field of vision Strategic: (System Capabilities not Critical to Safety of Flight)

Real-Time Wind Speed and Direction
1. Status of spray off/on, proportional flow and spray system pressure
2. Error conditions-spray switch on, low flow, low pressure
3. Temperature inversion warning
4. Wind shift warning
5. Additional hardware displaying spray area, no spray zones, both optimized coverage and intended target (wind corrected gridlines)
6. Real-time wind speed, direction vectors provided
7. Statistical display of mission performance (gallons sprayed, gallons remaining, acres treated, spray time, total mission time
8. Mission specific enunciators display on heads-up screen.

In one operation and as illustrated with reference again to FIG. 1, the first weather station 16 is tethered by the balloon 28 at the preselected altitude 18 and generally near the target 14 for providing weather data to the aircraft 12. The second weather station 20 positioned at ground level 22 and generally below the first weather station 16 and at or near the target 14 for providing ground area weather conditions. The weather conditions at the preselected altitude, generally about 300 feet more or less, and the weather conditions at ground level are used to provide optimum conditions, by possibly modifying the planned prescription, for distributing the chemicals from the aircraft at that specific time.

In yet another operation, the balloon 28 is tethered from an initial altitude to a second altitude while monitoring and recording weather data through intermediate altitudes. By way of example, and with reference again to FIGS. 4A and 5, the prescribed flight pattern 58 is changed to the modified pattern 62. The aircraft altitude may then be changed to an intermediate altitude for the chemical. By way of example, the aircraft altitude is changed from a planned 300 feet to a modified 250 feet; the direction is modified; and the swath 66 is modified, all based on the real-time conditions. Preferable, the weather data from the altitude and ground positioned weather stations may be synchronized and include temperature, relative humidity, altitude, wind sped and direction, data collection time, and data collection date, and the data may be transmitted at least once every second.

By way of further example, the FIG. 4 depicts a typical spray mission where the approved target 14 is 7×4.1 mile block. Wind at 10 mph., is at a direction perpendicular to the longest gridline. Spray altitude is 300 ft. While the insecticide is released from the spray aircraft 12 over the target area, the 20–30 micron average particle is most likely deposited outside the target area.

Figure 5:
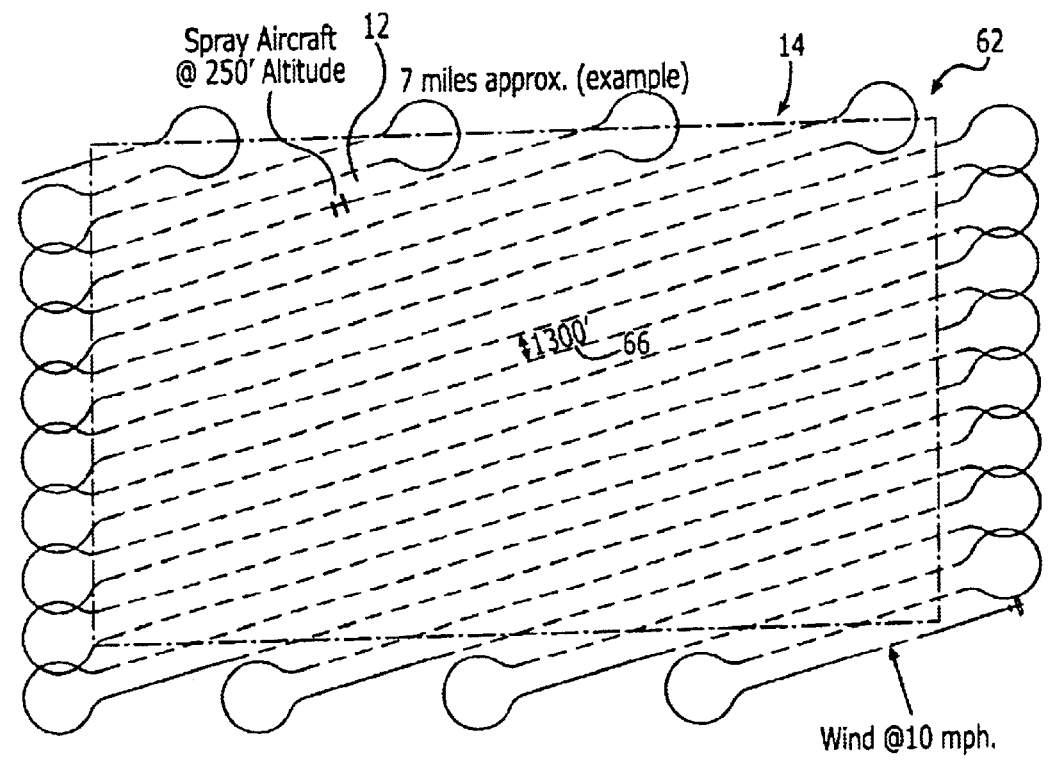

The drawing of FIG. 5 depicts a spray mission with identical target area and weather condition. By optimizing the real-time weather data and mission correction controller altitude is lowered to 250 ft. and swaths are increased to 1300 ft. apart depositing the 20–30 micron particles in the target area.

By way of further example, one embodiment of the weather statistics useful during mosquito control of chemical/insecticide application may be described by:

Physical Dimensions:

| | |
|---|---|
| Helium Balloon | 16' × 6' (widest) × 7.2' fin width/height) 292 cubic feet |
| Airborne Instrumentation | 17.5 cm × 15.7 cm × 10.1 cm |
| Ground Instrumentation | 17.5 cm × 15.7 cm × 10.1 cm |
| Ground Station Platform | Elevation range 6'–13.3' |
| Ground base tether | Elevation range up to 300' |
| Wind speed sensor | 12 cm diameter cup wheel assembly 40 mm diameter hemispherical cups |

Performance:

| | |
|---|---|
| Wind speed specification | |
| Range | 0 to 112 mph |
| Turning factor | 75 cm |
| Distance Constant | 2.3 m |
| Threshold | 1.1 meters per second (2.5) |
| Output frequency | 1 contact .75 m/s per Hz. |
| Wind Direction specification | |
| Range | 360 degree mechanical |
| Sensor | 16 cm turning radius |
| Transducer | Precision conductive plastic potentiometer 10K ohm |
| RF Transceiver | 433 MHz |
| Spread Spectrum Transceiver | 900 MHz range |
| Computer processor | 133 MHz |
| Memory | 32–300 SRAM |
| On-board battery monitor | |

One embodiment of the guidance system 54 may include:

Use of 3–133 MHz microprocessors

Memory 32–300 mb SRAM

900 MHz Spread Spectrum Transceiver 20+mile range

Vacuum Fluorescent Graphics display 7 key back lit keypad user interface with 16 intensity settings Redundant encoder user interface on front panel Redundant Pilots control yoke interface Anti-glare display filter Obstacle avoidance database on compact flash card Pre-planned spray mission on Compact flash card Power 9–30 volts DC Three 4–20 mA inputs One Timer input (Pulse input)

On-board 8-channel GPS receiver

RTCM 104 differential GPS correction available

Two Serial ports

External Light RS232 Communication

Two Analog Inputs

Such an embodiment may:

Provide instantaneous real-time weather data at ground level.

Provide instantaneous real-time weather data at desired aircraft altitude.

Transmit all meteorology data every second to the data recorder.

Transmit all meteorology data every second to the personal computer.

Transmit all meteorology data every second to the application aircraft.

Provide location (Lat/Long) of the balloon to application aircraft every second.

By way of yet further example, while deploying the balloon and when at a desired altitude, the aerial instrumentation may transmit weather data including time/date, altitude, temperature, humidity, and wind velocity by way of a 433 MHz RF transceiver to the ground instrumentation. The ground RF unit receives the aerial weather data and packages it with the ground weather data including the balloon location into a data pack, which is then transmitted back to the aerial unit through the 433 MHz RF unit. When the aerial instrumentation receives the entire weather data pack, it is then transmitted using the more powerful 900 MHz spread spectrum transceiver to either a ground receiver (PC) or to the aircraft in flight. This data is transmitted once per second.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. A method for applying chemicals to a ground target from an aircraft, the method comprising:

carrying a first weather station by an aerostat for providing altitude area weather data therefrom;

tethering the aerostat to a selected aerostat altitude environmentally coupled to a ground target upon which chemicals are to be applied;

positioning a second weather station at a ground location environmentally coupled the ground target for providing ground area weather data therefrom;

controlling an aircraft having chemicals stored therein for distributing the chemicals to the ground target from an aircraft altitude;

adjusting the aerostat altitude to conform with the aircraft altitude;

communicating altitude area and ground area weather data to the aircraft; and distributing the chemicals from the aircraft operating at the aircraft altitude based on a prescribed delivery pattern as modified by the altitude area and ground area weather data.

2. The method according to claim 1, wherein the aerostat tethering comprises:

tethering the aerostat from an initial altitude to a preselected altitude through intermediate altitudes therebetween;

analyzing the altitude and ground area weather data throughout the tethering; and modifying the aircraft altitude to a preferred altitude for the chemical distributing based on the altitude and ground area analyzing.

3. The method according to claim 1, wherein the aircraft communicating includes communicating between the first weather station, the second weather station and the aircraft.

4. The method according to claim 1, wherein the first and second weather stations comprise instruments selected from a group consisting of a magnetometer configured as a directional compass, an anemometer for determining wind speed, a solid state temperature sensor, a solid state sensor for measuring relative humidity, a solid state aneroid pressure transducer for altitude encoding, an RF transmitter employing spread spectrum processing, a two-way RF transceiver, global positioning receiver, and an interfacing microprocessor.

5. The method according to claim 1, wherein the aerostat comprises a helium filled balloon.

6. The method according to claim 1, further comprising anchoring the aerostat using a tether line secured at ground level.

7. The method according to claim 6, further comprising varying the altitude of the aerostat by reeling the tether line.

8. A method for applying chemicals to a ground target from an aircraft, the method comprising:

carrying a first weather station by an aerostat for providing altitude area weather data therefrom;

positioning a second weather station at a ground location environmentally coupled the ground target for providing ground area weather data therefrom;

receiving altitude and ground weather data transmitted from the first and second weather stations at a central communications station;

tethering the aerostat to a first aerostat altitude environmentally coupled to a ground target upon which chemicals are to be applied;

communicating altitude area and ground area weather data to the central communications station;

tethering the aerostat to a second aerostat altitude environmentally coupled to a ground target upon which chemicals are to be applied;

repeating the tethering and communicating steps;

communicating altitude area and ground area weather data to the aircraft;

adjusting the aircraft altitude to the aerostat altitude;

controlling an aircraft for distributing chemicals stored thereby to the ground target;

distributing the chemicals from the aircraft operating based on a prescribed delivery pattern as modified by the altitude area and ground area weather data.

9. The method according to claim 8, wherein the weather data receiving comprises synchronizing data selected from the group consisting of temperature, relative humidity, altitude, wind sped and direction, data collection time, and data collection date.

10. The method according to claim 8, further comprising:

processing the altitude and ground weather data storing the processed weather data; and transmitting the processed weather data to the aircraft.

11. The method according to claim 10, wherein the transmitting comprises transmitting the processed weather data from the central communications station to the aircraft.

12. The method according to claim 10, wherein the transmitting comprises transmitting the processed weather data from the central communications station to the aircraft.

13. The method according to claim 10, wherein the transmitting comprises:

transmitting the processed weather data from the central communications station to the first weather station; and transmitting the processed weather data from the first weather station to the aircraft.

14. The method according to claim 8, wherein the data communicating comprises updating weather data received from the first and second weather stations and transmittal updated data at least once every second.

* * * * *